(12) United States Patent
Lin

(10) Patent No.: US 11,130,419 B2
(45) Date of Patent: Sep. 28, 2021

(54) ELECTRIC VEHICLE CHARGING SYSTEM

(71) Applicant: Yu-Shun Lin, Taichung (TW)

(72) Inventor: Yu-Shun Lin, Taichung (TW)

(*) Notice: Subject to any disclaimer, the term of this patent is extended or adjusted under 35 U.S.C. 154(b) by 147 days.

(21) Appl. No.: 16/558,407

(22) Filed: Sep. 3, 2019

(65) Prior Publication Data
US 2021/0061116 A1 Mar. 4, 2021

(51) Int. Cl.
*B60L 53/37* (2019.01)
*H02J 7/02* (2016.01)
*B60L 53/65* (2019.01)
*B60L 53/14* (2019.01)
*B60L 53/126* (2019.01)

(52) U.S. Cl.
CPC .............. *B60L 53/37* (2019.02); *B60L 53/126* (2019.02); *B60L 53/14* (2019.02); *B60L 53/65* (2019.02); *H02J 7/025* (2013.01)

(58) Field of Classification Search
CPC ................................ B60L 53/37; B60L 53/126
USPC ......................................................... 320/108
See application file for complete search history.

(56) References Cited

U.S. PATENT DOCUMENTS

| | | | |
|---|---|---|---|
| 2010/0201309 A1* | 8/2010 | Meek | B60L 53/14 320/108 |
| 2011/0074351 A1* | 3/2011 | Bianco | G07F 15/005 320/109 |
| 2014/0354229 A1* | 12/2014 | Zhao | B60L 53/126 320/109 |
| 2015/0042278 A1* | 2/2015 | Leary | B60L 55/00 320/109 |
| 2016/0352113 A1* | 12/2016 | Zhao | B60L 53/35 |
| 2018/0001777 A1* | 1/2018 | Kilic | B60L 53/14 |
| 2018/0361870 A1* | 12/2018 | Zhao | B60L 53/14 |
| 2019/0118662 A1* | 4/2019 | Anzicek | B60L 53/64 |
| 2019/0135125 A1* | 5/2019 | Sponheimer | B60L 53/14 |
| 2019/0275907 A1* | 9/2019 | Lee | B60L 53/35 |
| 2019/0315240 A1* | 10/2019 | Wu | H02J 50/10 |
| 2019/0381891 A1* | 12/2019 | Moghe | B60L 53/38 |
| 2020/0009978 A1* | 1/2020 | Shin | B60L 53/66 |
| 2020/0031248 A1* | 1/2020 | Kwak | H02J 7/0042 |
| 2020/0101855 A1* | 4/2020 | Lee | B60L 53/35 |

* cited by examiner

*Primary Examiner* — Suchin Parihar
(74) *Attorney, Agent, or Firm* — Alan D. Kamrath; Karin L. Williams; Mayer & Williams PC

(57) ABSTRACT

An electric vehicle charging system includes a charging station for receiving a charging command and a positioning signal and a charging trolley connected to the charging station and provided with a license plate recognition module. The charging trolley receives power from the charging station and charges the electric vehicle, wherein, after receiving the charging command and the positioning signal, the charging station controls the charging trolley to go to a parking space in which the electric vehicle is parked to charge the electric vehicle.

8 Claims, 6 Drawing Sheets

ELECTRIC VEHICLE CHARGING SYSTEM

BACKGROUND OF THE INVENTION

1. Field of the Invention

The present invention relates to a charging system, and in particular, to an electric vehicle charging system.

2. Description of the Prior Arts

With the raising awareness of environmental protection, many products that pollute the environment, such as vehicles powered by gasoline, will be eliminated gradually and replaced by electric vehicles that are powered by electricity. Due to the advantages of lower carbon emissions and less pollution, electric vehicles are gradually becoming the mainstream for future vehicles.

At present, in addition to charging with a car charger installed at home, if there is a need to charge outdoors, an electric vehicle needs to be charged at the charging station with charging piles. Nowadays, car charging stations usually have a large number of charging piles to charge multiple electric vehicles.

However, it costs a lot to build a large number of charging piles, and the charging piles must be built at a specific position in the charging station and cannot be freely moved. If there is a need for charging during driving, it is not convenient to drive the electric vehicle to the charging pile for charging.

Furthermore, an existing parking lot has multiple charging piles, with one charging pile beside each parking space. The electric vehicle is driven into a parking space and charges with the charging pile on the side. Although it is convenient to charge, it also requires building a charging pile next to each parking space, which will greatly increase the setup cost.

In addition, if one forgets to charge the electric vehicle after it is parked, the electric vehicle may not be readily available for the next ride because the battery is dead, which is inconvenient.

To overcome the shortcomings, the present invention provides an electric vehicle charging system to mitigate or obviate the aforementioned problems.

SUMMARY OF THE INVENTION

In order to reduce the cost of setting up the charging stations, the present invention proposes an electric vehicle charging system, which provides a charging trolley to automatically move to the electric vehicle parking space to charge an electric vehicle, thereby reducing the cost and improving charging convenience.

An electric vehicle charging system in a parking lot that includes multiple parking spaces for parking electric vehicles, comprises:

a charging station receiving a charging command and a positioning signal;

a charging trolley connected to the charging station and having a license plate recognition module, and receiving power from the charging station for charging an electric vehicle;

after receiving the charging command and the positioning signal, the charging station controlling the charging trolley to go to the parking space in which the electric vehicle is parked and uses the license plate recognition module to identify the license plate of the electric vehicle, and when the license plate is identified, the charging trolley automatically charges the electric vehicle.

Based on the above, the following effects can be achieved by the present invention:

1. The charging trolley automatically charges the electric vehicle. The problem of forgetting to charge the electric vehicle can be avoided.

2. A battery device of the charging trolley may adopt a rapid-charge rechargeable battery to speed up the charging.

3. The charging station can select the type of power supply to be used when charging the charging trolley, such as mains electricity (including peak power, off-peak power) and renewable energy. By properly selecting types of power supplies for the charging trolley, advantages of saving energy, reducing carbon emissions and lowering electricity costs can be achieved.

4. The electric vehicle can report power consumption speed, battery energy, and remaining power to the charging station in real time, so that the charging station determines the type of power supply to charge the charging trolley in the most efficient manner.

5. Multiple charging trolleys can charge multiple electric vehicles parked in the parking lot in batches, so there is no need to configure one charging trolley for each electric vehicle, thereby reducing construction cost and overcoming the problem of insufficient charging post and charging position.

6. The charging station can charge the charging trolley in different manners such as a wired connection, a wireless connection or a contact connection. The using of a charging trolley capable of wired charging, wireless charging or contact charging may be based on the specification of the parking lot or the distance relative to the location where the vehicle is parked. In addition, the parking lot can also be provided with multiple charging trolleys of different charging manners to charge the electric vehicle by wired, wireless or contact manners.

Other objectives, advantages and novel features of the invention will become more apparent from the following detailed description when taken in conjunction with the accompanying drawings.

DETAILED DESCRIPTION OF THE PREFERRED EMBODIMENTS

Figure 1:
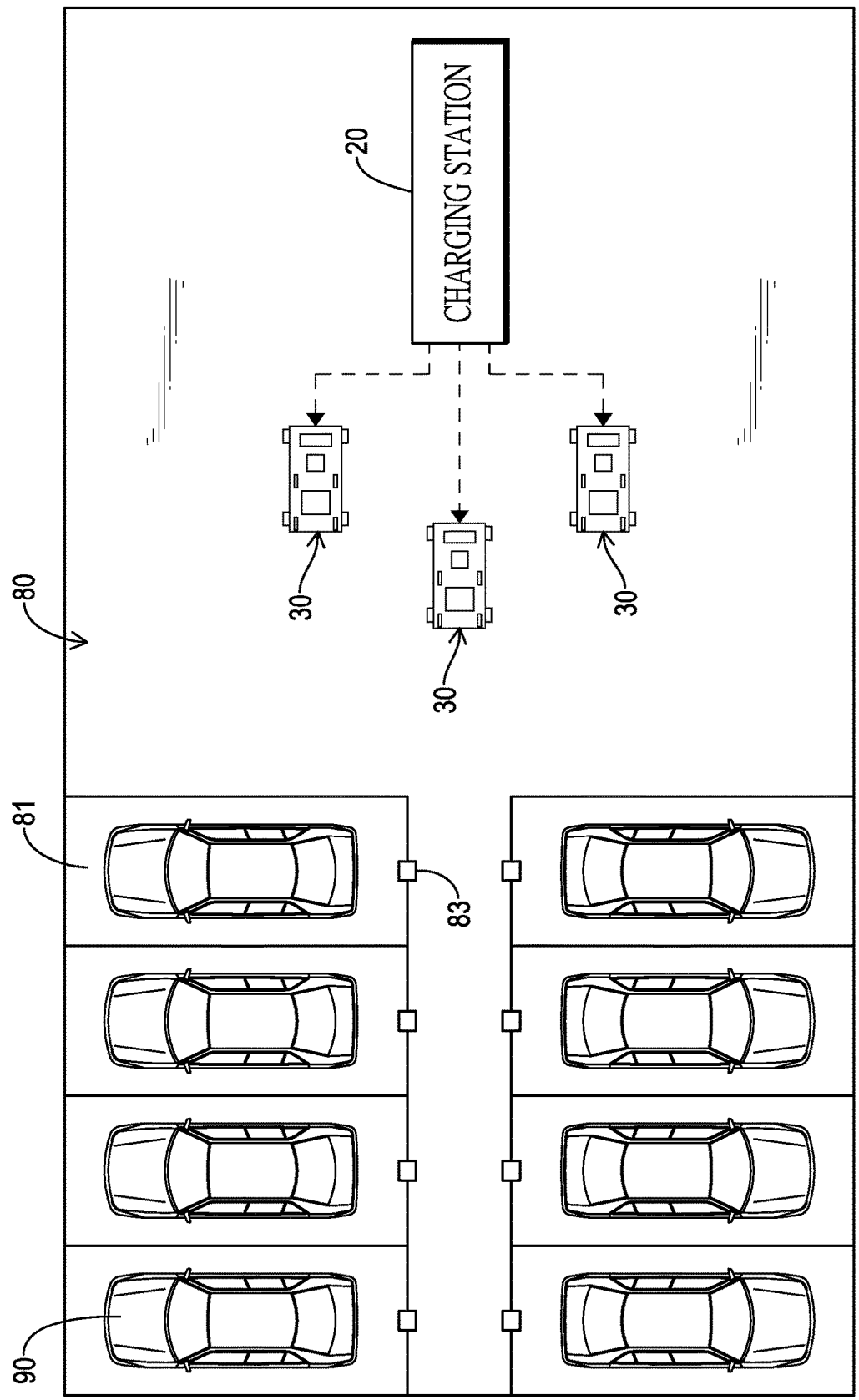
FIG. 1 is a schematic view of the present invention.
Figure 2:
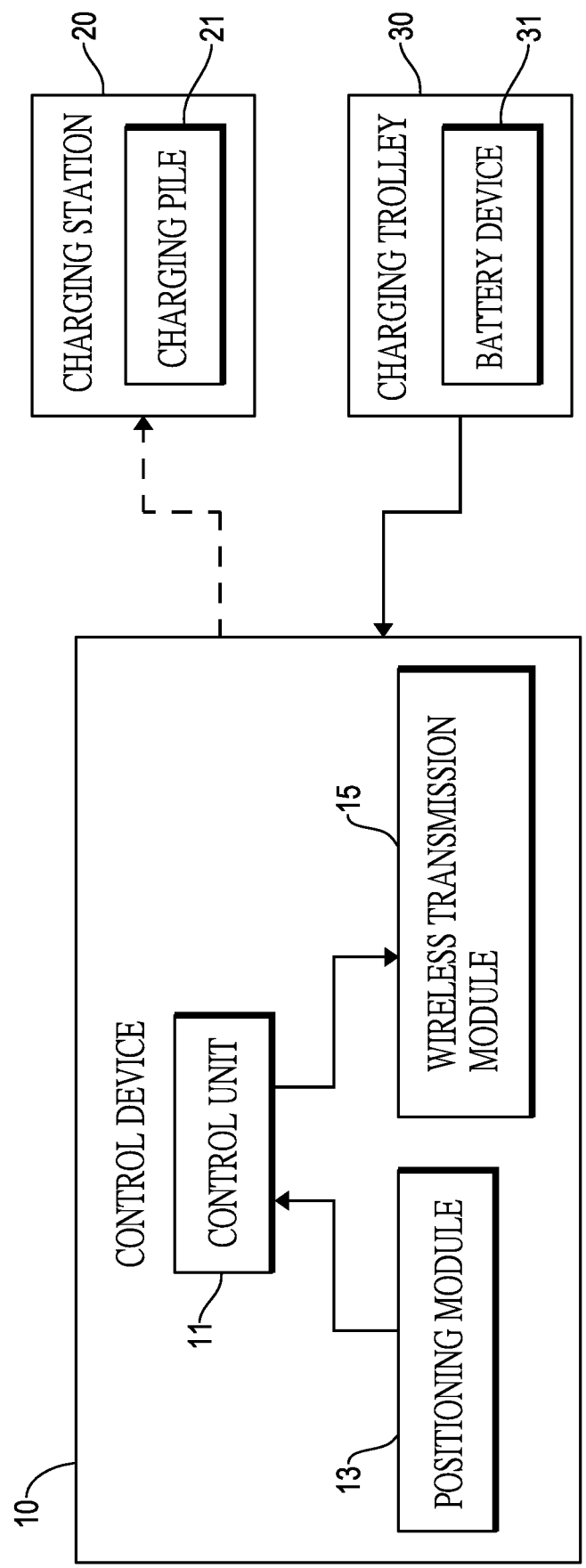
FIG. 2 is a circuit block diagram showing a first preferred embodiment of the present invention.
Figure 3:
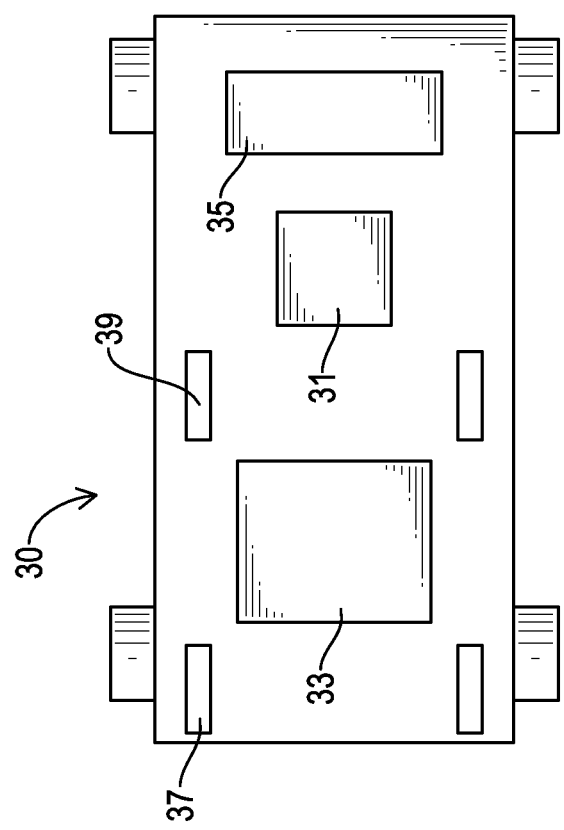
FIG. 3 is a schematic top view of a charging trolley of the present invention.

Referring to FIG. 1 the present invention shows an electric vehicle charging system, which can be applied to a parking lot 80. When an electric vehicle 90 is parked in a parking space 81 of the parking lot 80, a mobile charging trolley can move to the parking place 81 and charges the electric vehicle 90. Referring to FIG. 2 further, the electric vehicle charging system comprises a charging station 20 and a charging trolley 30.

Figure 4:
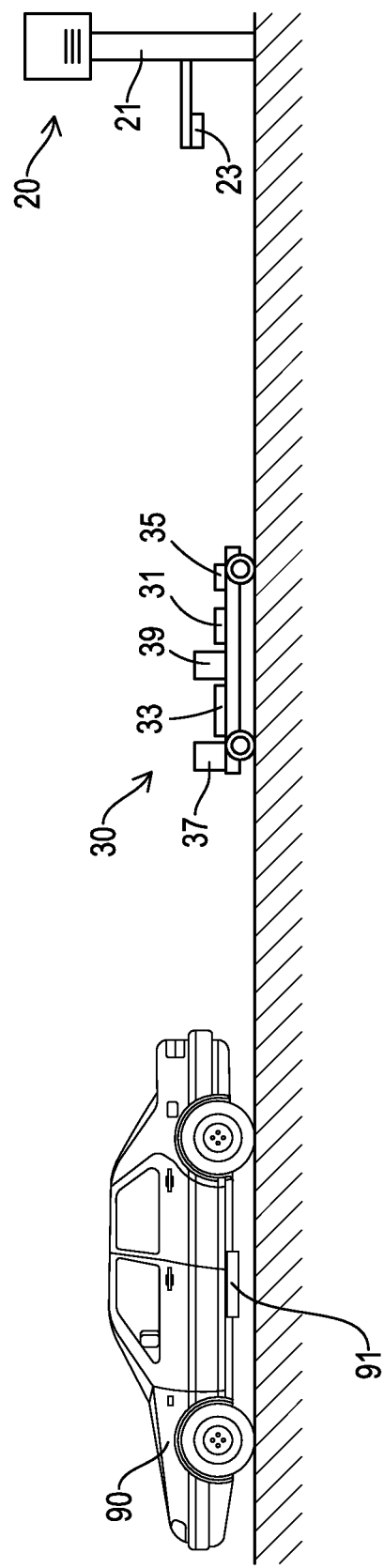
FIG. 4 is a schematic diagram of wireless charging for the charging trolley.
Figure 5:
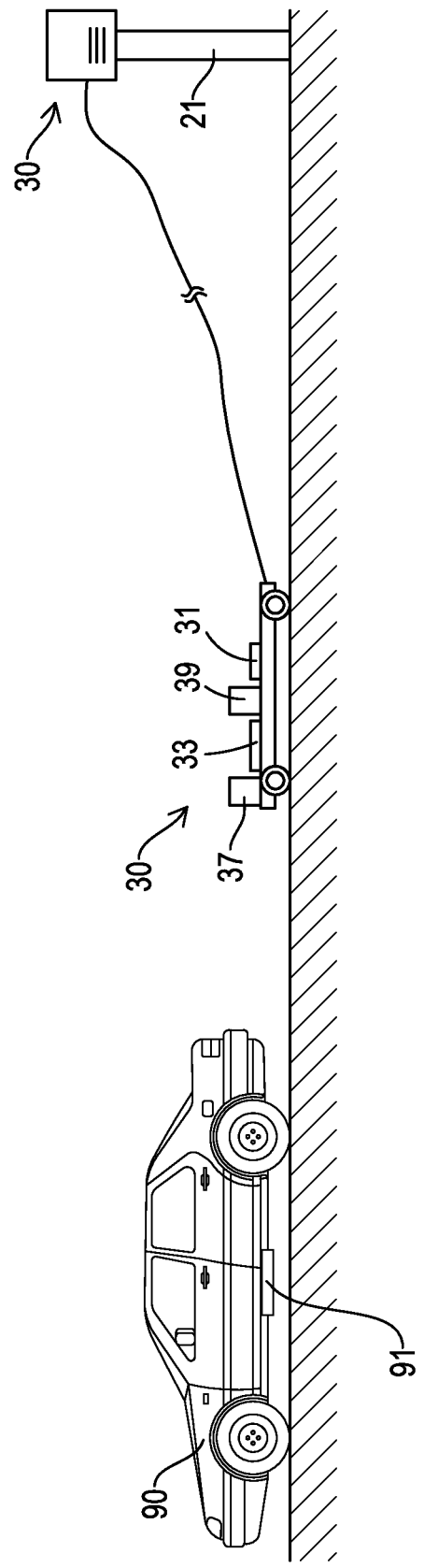
FIG. 5 is a schematic diagram of wired charging for the charging trolley.

The charging station 20 is for receiving a charging command and a positioning signal. The charging station 20 can be disposed in the parking lot 80 and can charge the charging trolley 30 in a wired, wireless or contact manner. In FIG. 4, the charging station 20 wirelessly charges the charging trolley 30, wherein the charging station 20 may further include at least one charging pile 21 and a first charging sensing terminal 23 disposed on the charging pile 21. Referring to FIG. 5, the charging trolley 30 is electrically connected to the charging pile 21 in a wired manner.

The charging trolley 30 is connected to the charging station 20 for receiving power from the charging station 20 and charging the electric vehicle 90. The charging trolley 30 can be connected to the charging station 20 in a wired, wireless or contact manner. Further, a power transmission terminal 33 is provided on the charging trolley 30 for transmitting power to the electric vehicle 90. In one embodiment that the charging trolley 30 is wirelessly connected to the charging station 20, the charging trolley 30 may further include a second charging sensing terminal 35 that can receive the power transmitted by the first charging sensing terminal 23 in a wireless manner. In another embodiment that the charging trolley 30 is in contact with the charging station 20, the second charging sensing terminal 35 can be in contact with the first charging sensing terminal 23 to charge the charging trolley 30 by receiving the power transmitted by the first charging terminal 23. In yet another embodiment, the charging trolley 30 is connected to the charging station 20 in a wired manner, so that the charging trolley 30 can directly receive the power of the charging station 20 to charge the electric vehicle 90.

The charging trolley 30 further includes a license plate recognition module 37, which is disposed on the charging trolley 30 for identifying the license plate of the electric vehicle 90 and ensures that the charging trolley 30 charges the correct electric vehicle 90.

The charging trolley 30 is lower than the chassis of the electric vehicle 90 in height in order to move to the bottom of the electric vehicle 90 to charge the electric vehicle 90. A chassis charging terminal 91 is disposed on the chassis of the electric vehicle 90. The chassis charging terminal 91 and the power transmitting terminal 33 can be connected in a wired, wireless or contact manner, so that the charging trolley 30 can charge in a wired, wireless or contact manner. For example, in one embodiment where the chassis charging terminal 91 and the power transmitting terminal 33 are connected in a wired manner, the power transmitting terminal 33 can be a connector, the chassis charging terminal 91 is a charging port, and the connector can be inserted into the charging port for charging. In another embodiment in which the chassis charging terminal 91 and the power transmitting terminal 33 are connected in a wireless manner, the chassis charging terminal 91 can be a power receiving board, the power transmitting terminal 33 can be a wireless charging board, and the wireless charging board transmits power to the power receiving board. In yet another embodiment in which the chassis charging terminal 91 and the power transmitting terminal 33 are connected in a contact manner, the chassis charging terminal 91 can be in contact with the power transmitting terminal 33, and the power transmitting terminal 33 transmits the power to the chassis charging terminal 91 in a contact manner. An RFID chip, a one-dimensional barcode or a two-dimensional barcode (for example, QR Code, Barcode) may be disposed near the chassis charging terminal 91, The charging trolley 30 can further include a charging identification unit 39. The charging identification unit 39 can be a sensor for sensing the RFID chip or scanning the one-dimensional or the two-dimensional barcode, or a camera to correct the position of the charging trolley 30. Based on the charging identification unit 39, the charging trolley 30 can be finely adjusted to a correct angle to align with the chassis charging terminal 91.

The following describes the generation of the charging command and the positioning signal.

In a first preferred embodiment of the present invention, the charging command and the positioning signal are generated by a control device 10.

The control device 10 is disposed on the electric vehicle 90 for generating the charging command and the positioning signal. Specifically, the control device 10 includes a control unit 11, a positioning module 13, and a wireless transmission module 15. The control unit 11 is for generating the charging command. The positioning module 13 is electrically connected to the control unit 11 for positioning the electric vehicle 90, generating the positioning signal, and transmitting the positioning signal to the control unit 11. The wireless transmission module 15 is electrically connected to the control unit 11 for wirelessly transmitting the charging command and the positioning signal to the charging station 20. Specifically, the positioning module 13 can be a Wi-Fi positioning module, a GPS positioning module, or a positioning module using other positioning manners, such as Bluetooth, Zigbee or IEEE positioning. The wireless transmission module 15 can be a long-distance wireless transmission module with a 3G, 4G, 5G communication protocol, a Wi-Fi wireless transmission module, a Bluetooth wireless transmission module or a Zigbee wireless transmission module. The control device 10 can be a vehicle computer.

Figure 6:
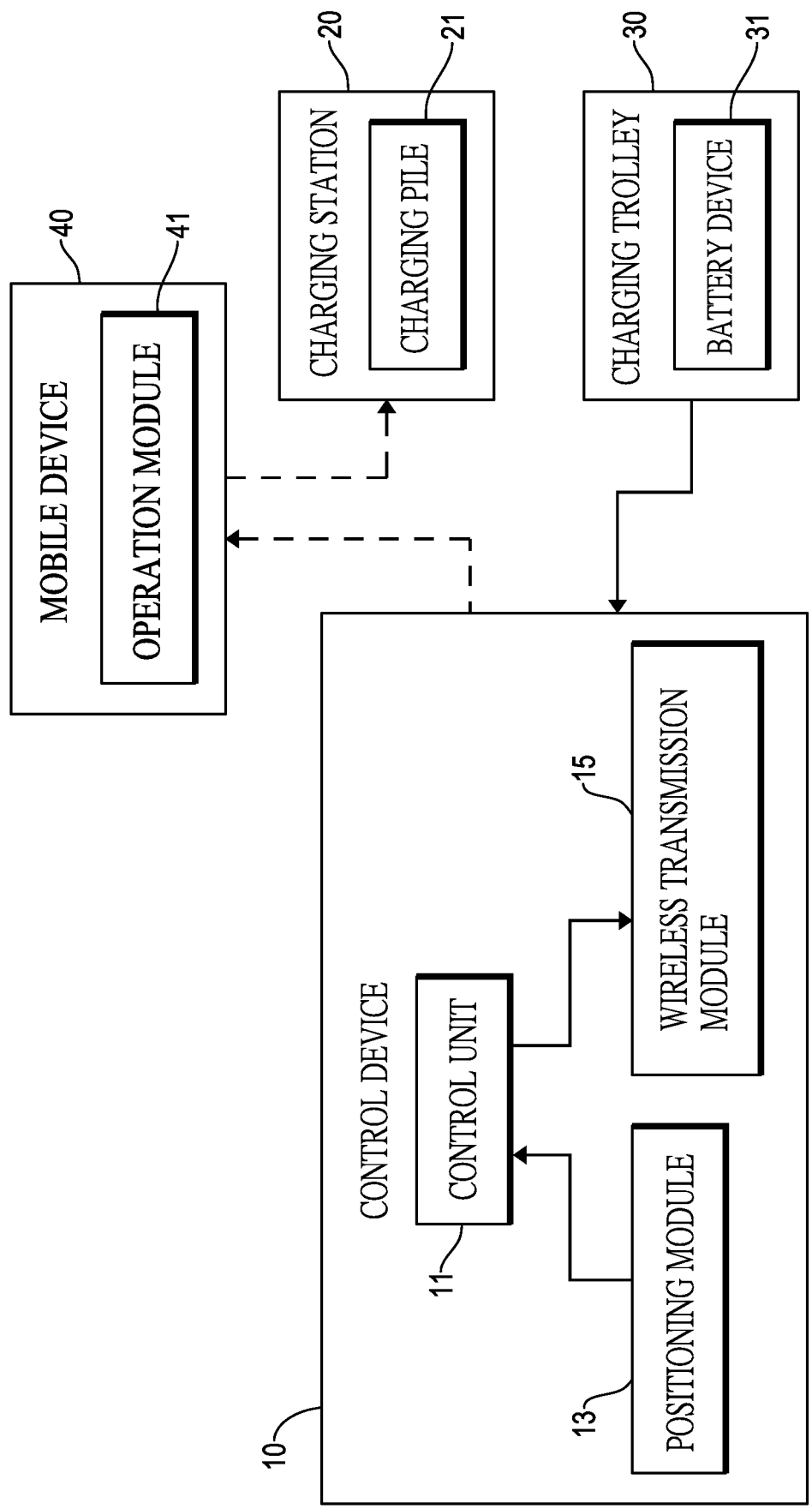
FIG. 6 is a circuit block diagram showing a second preferred embodiment of the present invention.

Referring to FIG. 6, in a second preferred embodiment of the present invention, the positioning signal is generated by the control device 10, and the charging command is generated by an operation module 41. The operation module 41 can be disposed in a mobile device 40, and the mobile device 40 can be a smartphone or a tablet. The difference from the first preferred embodiment is that the charging command is transmitted by the operating module 41. After the electric vehicle 90 is stopped, the operation module 41 of the mobile device 40 can be operated to send the charging command to the charging station 20, and the control device 10 sends the positioning signal to the charging station 20 to make the charging trolley 30 charge the electric vehicle 90.

In a third preferred embodiment of the present invention, the positioning signal is generated by a positioning camera module 83, and the charging command is generated by the operation module 41. Each parking space 81 is provided with a positioning camera module 83. When the electric vehicle 90 is parked in the parking space 81, the positioning camera module 83 recognizes the license plate of the electric vehicle 90 and generates the positioning signal, and transmits the positioning signal to the charging station 20. After the charging station 20 receives the charging command and the positioning signal, the charging trolley 30 is driven to the parking space 81 to charge the electric vehicle 90.

In a fourth preferred embodiment of the present invention, the positioning signal is generated by the positioning camera module 83, and the charging command is generated by control module 10.

The operations of the present invention are as follows:

S11: Generating the charging command and the positioning signal.

In the first preferred embodiment of the present invention, when the electric vehicle 90 is driven to the parking space 81, the control device 10 can position the electric vehicle 90 and generate the positioning signal through the positioning module 13, and generate the charging command through the control unit 11. Then the charging command and the positioning signal are transmitted to the charging station 20 by the wireless transmission module 15.

S12: Controlling the charging trolley 30 to charge the electric vehicle 90 by the charging station 20.

After receiving the charging command and the positioning signal, the charging station 20 controls the charging trolley 30 to move to the position of the electric vehicle 90 according to the positioning signal, and then controls the charging trolley 30 to charge the electric vehicle 90. When the battery of the electric vehicle 90 is fully charged, the charging station 20 controls the charging trolley 30 to return to a parking space of the charging trolley 30. The control device 10 can detect the power of the vehicle battery. When the control device 10 detects that the power of the vehicle has reached 100%, the control device 10 sends a signal to the charging station 20 through the wireless transmission module 15. The charging station 20 controls the charging trolley 30 back to its parking space to stand by and charge the charging trolley 30.

The driver can automatically or manually control the charging trolley 30 to charge the electric vehicle 90. In the manual manner, after the electric vehicle 90 is stopped, the driver can manually operate the control device 10 to send the positioning signal and the charging instruction to the charging station 20, and then the charging station 20 controls the charging trolley 30 to charge the electric vehicle 90. In the automatic manner, the driver can preset an automatic charging mode in the control device 10. When the control device 10 receives a charging condition, the control device 10 automatically sends the positioning signal and the charging command to the Charging station 20, and the charging station 20 controls the charging trolley 30 to charge the electric vehicle 90. The charging condition may be that the electric vehicle 90 is powered off. When the control device 10 detects that the electric vehicle 90 is powered off, the control device 10 automatically sends the positioning signal and the charging command to the charging station 20.

In a fifth preferred embodiment of the present invention, the charging trolley 30 further includes a battery device 31 for storing power provided by the charging station 20. Further, the battery device 31 can be a battery having a storage capacity greater than a vehicle battery capacity of the electric vehicle 90. Specifically, the battery device 31 can be a lithium iron battery, a lithium ion battery, a lead acid battery, or a fuel battery. In addition, the battery device 31 may be made of a fireproof and explosion-proof material, and can use an oxygen-free storage container to avoid accidents such as fire and explosion. The battery device 31 can be pre-charged by the charging station 20 before the electric vehicle 90 is parked in the parking space. After the battery device 90 is fully charged and the electric vehicle 90 is parked, the electric power stored in the battery device 31 can be transferred to the electric vehicle 90. The electric vehicle 90 adopts a fast charging technology to increase the charging speed several times.

For example, ted to the household's power capacity, if a power supply 220V/20 A (4400 VA) is used to charge the electric vehicle 90, the charging capacity=220V*20 A*0.92 (charger efficiency/power facto)=4.048 KW. After 2 days of driving, a 100 KW-hr electric vehicle will be fully charged using mains electricity at home for nearly 24 hr (4.048 KW*24.7 hr≈100 KW-hr).

If the charging trolley 30 supporting fast-speed charging is applied to charge the electric vehicle 90, when the electric vehicle 90 has run more than one day, the battery device 31 of the charging trolley 30 can quickly charge the electric vehicle 90 with 100 KW-hr of electric power in 2 to 5 hours.

In a sixth preferred embodiment of the present invention, the power of the charging station 20 can be provided by mains electricity or renewable energy, wherein the mains electricity can include the peak power and the off-peak power. For example, the present invention can be connected to a solar power plant. The battery device 30 of the charging trolley will be fully charged for a long time, thereby solving the problem of low power generation efficiency of the solar power plant and achieving the effect of energy saving and carbon reduction at the same time. The charging time of the charging trolley 30 can be programmed in the present invention. For example, the charging trolley 30 can be charged with off-peak power during the off-peak time, which greatly reduces electricity consumption.

In a seventh preferred embodiment of the present invention, in order to avoid the problem that the renewable energy charges the battery 31 too slowly to have ample time to fill it up, the charging station 20 can be charged by both the renewable energy and mains electricity. The control device 10 can report the power consumption condition on the electric vehicle 90 to the charging station 20 through the wireless transmission module 15 having the ability of long-distance transmission. The charging station 20 adjusts the proportion of the mains electricity according to the power consumption condition, thereby achieving the effects of energy saving, carbon reduction and power saving and avoiding the problem that the charging speed of the renewable energy is too slow. For example, the control device 10 calculates and returns a real-time power consumption Pd and a consumed power Ed of the battery device 31 to the charging station 20, and the charging station 20 calculates a required charging power Pc of the charging trolley 30, wherein the required charging power Pc is calculated as follows:

$$Pc=Pd+(Ed-Ec)/t$$

Wherein, Ec is the power that the battery device 31 has charged, t is the expected time of consumed power and can be adjusted according to actual situation, for example, t=2 (hours).

Finally, the total electric power required is calculated as follows:

$$P_N+Pp=Pc*k-Pr,$$

wherein, $P_N$ represents the off-peak power of the mains electricity, Pp represents the peak power of the mains electricity, Pr represents the charging power supplied to the battery device 31 by the renewable energy, and k is a coefficient. The charging trolley 30 can fully charge the vehicle battery only if the stored power of the battery device 31 must be greater than k times the consumed power Ed. The coefficient k can be adjusted by the manager of the charging system according to actual conditions, for example, k is adjusted 1.1, 1.2, or 1.3, which indicates that the stored power of the battery device 31 must be greater than 1.1, 1.2, or 1.3 times the consumed power Ed.

In an eighth preferred embodiment of the present invention, the charging trolley 30 may further be provided with an inertial measurement unit for indoor positioning. When the indoor parking lot is unable to be precisely positioned by GPS, the charging trolley 30 can be positioned by the license plate recognition module 37 and the inertial measurement unit to accurately find and charge the electric vehicle 90. After the charging is completed, the charging trolley 30 returns to its parking place by indoor positioning and is charged by the charging station 20. In addition, the charging trolley 30 can recognize the electric vehicle 90 by the license plate recognition module 37, for example, confirming the electric vehicle 90 to be charged by identifying the license plate of the electric vehicle 90. In addition, an identifier may be provided to each parking space. Then the driver may input an identifier of the parking space through the control device 10 or the operation module 41 and transmit it to the charging station 20, the charging station 20 assigns a charging trolley 30 to the parking space corresponding to the identifier, and the charging trolley 30 can identify the identifier of the parking space by the license plate recognition module 37 to confirm the correct location of the electric vehicle 90 to be charged.

Furthermore, in the new indoor parking lot or parking space, the charging trolley first needs to receive raining for the parking lot module, so that the charging trolley 30 has the analytical ability in different parking spaces in the future. The license plate recognition module 37 and the inertial measurement unit are used for indoor positioning, and a main map of the indoor parking lot is drawn according to the positioning result and the captured image through Machine Learning, so as to be compatible with any parking lot without having to manually enter the indoor map.

The rental method of the charging trolley 30 is as follows: each of the charging trolleys 30 can be further networked; the detailed information of the electric vehicle 90, such as power, location, status, renter, and vehicle type, is sent to a central server, and the central server records the above information and open rental permission. The driver can apply for an account to the central server via the Internet and bind the account to a credit card. During rental, the charging trolley 30 calculates the rent to be paid according to the amount of electricity consumed and the mode of usage.

To prevent intentional destruction or theft, the charging trolley 30 can leave the charging station 20 only if the parking space 81 is rented, and a regional internet is built on the Mesh WIFI network to monitor all parking spaces. Based on security concerns, the regional Internet will not be activated without monitoring. In addition, after completing charging, the user can make a payment to a payment system of the charging station 20 by credit card or with a virtual account.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent TO indicated by the broad general meaning of the terms in which the appended claims are expressed.

What is claimed is:

1. An electric vehicle charging system, in a parking lot that includes multiple parking spaces for parking electric vehicles, the system comprising:
   a charging station, including at least one charging pile, on which a first charging sensing terminal is disposed, receiving a charging command and a positioning signal;
   a charging trolley, including a second charging sensing terminal, wirelessly receiving power transmitted by the first charging sensing terminal of the at least one charging pile in a wireless manner, connected to the charging station and having a license plate recognition module, and receiving power from the charging station for charging an electric vehicle parked in one of the parking spaces;
   after receiving the charging command and the positioning signal, the charging station controlling the charging trolley to go to the parking space in which the electric vehicle is parked and using the license plate recognition module to identify the license plate of the electric vehicle, and when the license plate is identified, the charging trolley automatically charges the electric vehicle;
   wherein the charging station is powered by renewable energy and mains electricity, wherein the mains electricity includes peak power and off-peak power, and the charging station adjusts the proportion of the renewable energy to the mains electricity according to power consumption of a vehicle battery of the electric vehicle.

2. The electric vehicle charging system as claimed in claim 1, further comprising:
   a control device disposed on the electric vehicle for generating the charging command and the positioning signal.

3. The electric vehicle charging system as claimed in claim 1, further comprising:
   a control device disposed on the electric vehicle for generating the positioning signal; and
   an operation module disposed on a mobile device for generating the charging command.

4. The electric vehicle charging system as claimed in claim 1, further comprising:
   a positioning camera module disposed in each parking space for identifying the license plate of the electric vehicle and generating the positioning signal when the electric vehicle is parked into the parking space;
   an operation module disposed on a mobile device for generating the charging command.

5. The electric vehicle charging system as claimed in claim 1, further comprising:
   a positioning camera module disposed in at least one parking space for identifying the license plate of the electric vehicle and generating the positioning signal when the electric vehicle is parked into the parking space; and
   a control device disposed on the electric vehicle for generating the charging command.

6. The electric vehicle charging system as claimed in claim 1, the charging trolley including:
   a battery device having a storage capacity greater than a capacity of the vehicle battery, and
   a power transmission terminal for connecting to a chassis charging terminal provided on a chassis of the electric vehicle in a wired, wireless or contact manner.

7. The electric vehicle charging system as claimed in claim 6, wherein the charging station receives a real-time power consumption and a consumed power of the vehicle battery, and calculates a required charging power of the charging trolley, wherein the required charging power is calculated as follows:

$$Pc=Pd+(Ed-Ec)/t,$$

wherein Pc is the required charging power, Ec is the power that the battery device has charged, Pd is the real-time power consumption, Ed is the consumed power, and t is the expected time of the consumed power;

the mains electricity power is calculated as follows:

$$PN+Pp=Pc*k-Pr,$$

wherein PN is the off-peak power, Pp is the peak power, Pr is the charging power supplied by the renewable energy to the battery device; k is a coefficient which represents that the stored power of the battery device must be greater than k times the consumed power Ed.

8. The electric vehicle charging system as claimed in claim 7, wherein the real-time power consumption of the vehicle battery and the consumed power are calculated by a vehicle computer provided on the electric vehicle.

\* \* \* \* \*